United States Patent
Seith et al.

(10) Patent No.: US 10,723,009 B2
(45) Date of Patent: Jul. 28, 2020

(54) POWER TOOL REVERSIBLE TRANSMISSION

(71) Applicant: Ingersoll-Rand Company, Davidson, NC (US)

(72) Inventors: Warren A. Seith, Bethiehem, PA (US); Mark T. McClung, Andover, NJ (US); Rohith Thyagaraj, Bangalore (IN)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 278 days.

(21) Appl. No.: 15/811,024

(22) Filed: Nov. 13, 2017

(65) Prior Publication Data

US 2019/0143500 A1    May 16, 2019

(51) Int. Cl.
*B25B 23/147* (2006.01)
*B23B 45/00* (2006.01)
(Continued)

(52) U.S. Cl.
CPC .............. *B25F 5/001* (2013.01); *B23B 45/00* (2013.01); *F16D 11/10* (2013.01); *F16H 3/54* (2013.01);
(Continued)

(58) Field of Classification Search
CPC ....... B23B 45/00; B23B 45/008; F16D 11/10; F16H 3/54; F16H 3/60; F16H 2200/2035; F16H 2200/2097; F16H 2200/2005; B25F 5/00; B25F 5/001; B25D 16/006; B25D 2216/0023; B25D 2216/003; B25D 2216/0038; B25D 2216/0015; B25B 21/00
(Continued)

(56) References Cited

U.S. PATENT DOCUMENTS 2,011,068 A * 8/1935 Miner ..................... B23C 1/027
                                                    409/151
2,388,455 A    3/1943 White
(Continued)

FOREIGN PATENT DOCUMENTS

TW    201319431 A  *  5/2013    ............... F16H 3/54
TW    201319431 A1    5/2013

OTHER PUBLICATIONS

Machine translation of TW201319431 (Year: 2013).*
Extended European Search Report, European Patent Application No. 18205533.5, dated Mar. 15, 2019, 8 pages.

*Primary Examiner* — Hemant Desai
*Assistant Examiner* — Bashir Alsaidi
(74) *Attorney, Agent, or Firm* — Taft Stettinius & Hollister LLP (57) ABSTRACT

A powered tool is depicted which includes a transmission that permits an input shaft to rotate in a single rotational direction during operation of the powered tool, but otherwise allowing the rotation of an output shaft to change direction depending on the arrangement of the transmission. In one form a first shaft is coupled with a planetary gearing arrangement which includes planetary gears and a ring gear. A second shaft is coupled with a moveable clutch. When the clutch is moved to a first position it is coupled to bypass the ring gear which provides rotation of the second shaft in the same direction as the first shaft. When the clutch is moved to a second position to engage the ring gear the direction of rotation of the second shaft is opposite the first shaft.

19 Claims, 5 Drawing Sheets

(51) Int. Cl.
*B25F 5/00* (2006.01)
*F16H 3/60* (2006.01)
*F16H 3/54* (2006.01)
*F16D 11/10* (2006.01)

(52) U.S. Cl.
CPC ....... *F16H 3/60* (2013.01); *F16H 2200/2035* (2013.01); *F16H 2200/2097* (2013.01)

(58) Field of Classification Search
USPC .......................................................... 173/216
See application file for complete search history.

(56) References Cited

U.S. PATENT DOCUMENTS

| | | | |
|---|---|---|---|
| 2,482,573 A | 9/1949 | Banker | |
| 2,882,684 A * | 4/1959 | Kelley | F16H 61/56 60/354 |
| 4,284,109 A * | 8/1981 | Kilmer | H01R 43/033 140/122 |
| 4,364,286 A | 12/1982 | Ciolli | |
| 4,573,370 A * | 3/1986 | Clemens | B25B 21/00 173/218 |
| 4,597,453 A * | 7/1986 | Kilmer | B25B 21/00 140/122 |
| 5,094,133 A * | 3/1992 | Schreiber | B25B 23/141 173/15 |
| 6,223,833 B1 * | 5/2001 | Thurler | B25D 16/00 173/109 |
| 6,244,358 B1 * | 6/2001 | Beer | B25B 21/00 173/170 |
| 7,159,671 B2 | 1/2007 | Soderlund | |
| 8,172,004 B2 * | 5/2012 | Ho | B23B 45/008 173/176 |
| 2004/0211576 A1 * | 10/2004 | Milbourne | B23B 45/008 173/48 |
| 2010/0163261 A1 * | 7/2010 | Tomayko | B23B 45/008 173/47 |
| 2012/0100948 A1 * | 4/2012 | Lin | B62M 6/65 475/149 |
| 2013/0165292 A1 * | 6/2013 | Brugger | F16H 3/005 475/294 |
| 2015/0152961 A1 * | 6/2015 | Stevens | F16H 61/16 74/473.21 |
| 2015/0330480 A1 * | 11/2015 | Wynne | F16D 11/14 475/269 |
| 2017/0248196 A1 * | 8/2017 | Turner | F02N 11/0851 |
| 2017/0259915 A1 * | 9/2017 | Cremiere | B64C 27/56 |

* cited by examiner

POWER TOOL REVERSIBLE TRANSMISSION

TECHNICAL FIELD

The present invention generally relates to power tools, and more particularly, but not exclusively, to power tools having a forward and a reverse direction.

BACKGROUND

Providing power tools with the ability to change between forward and reverse direction remains an area of interest. Some existing systems have various shortcomings relative to certain applications. Accordingly, there remains a need for further contributions in this area of technology.

SUMMARY

One embodiment of the present invention is a unique power tool having forward and reverse directions. Other embodiments include apparatuses, systems, devices, hardware, methods, and combinations for changing between forward and reverse direction in power tools. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
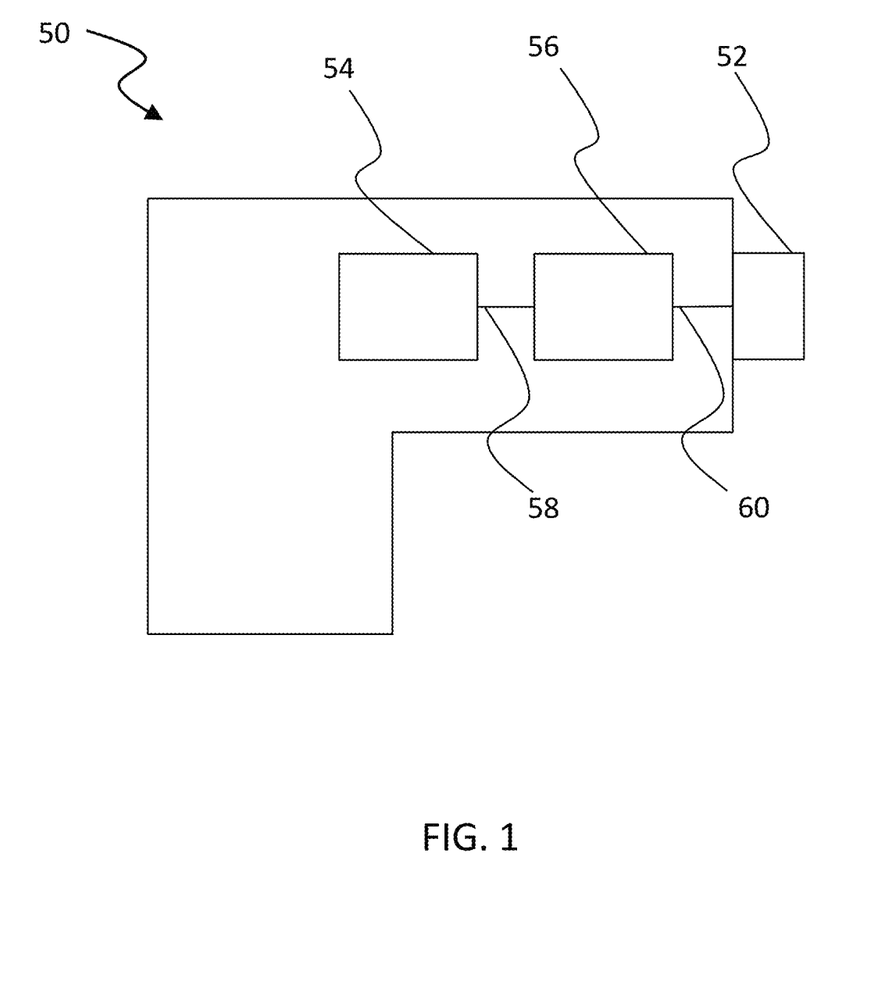
FIG. 1 depicts one embodiment of a powered tool.

With reference to FIG. 1, one embodiment of a hand held tool 50, such as a powered assembly tool, is illustrated which can be used to provide driving power to any number of power tool driven members 52 such as sockets, drill bits, etc. The hand held tool 50 can include or be coupled with a motor 54 to drive the power tool driven members 52. The motor 54 can take many different forms, including a pneumatic air motor, an electric motor, etc. The hand held tool 50 of the illustrated embodiment is able to selectively drive the power tool driven members 52 in either a forward or a reverse direction through use of a transmission 56. As depicted, input power 58 can be delivered from the motor 54 to the transmission 56 which in turn conveys an output power 60 to the power tool driven member 52. Although the transmission 56 is depicted as being used within a hand held tool 50, other applications are also envisioned for the transmission whether or not coupled with a hand held tool 50. In one non-limiting example, the transmission 56 can be coupled with a self-shifting transmission apparatus, one example of which is depicted in U.S. Pat. No. 6,165,096 which is herein incorporated by reference in its entirety, wherein the combination provides both self-shifting and reversible output.

Figure 2:
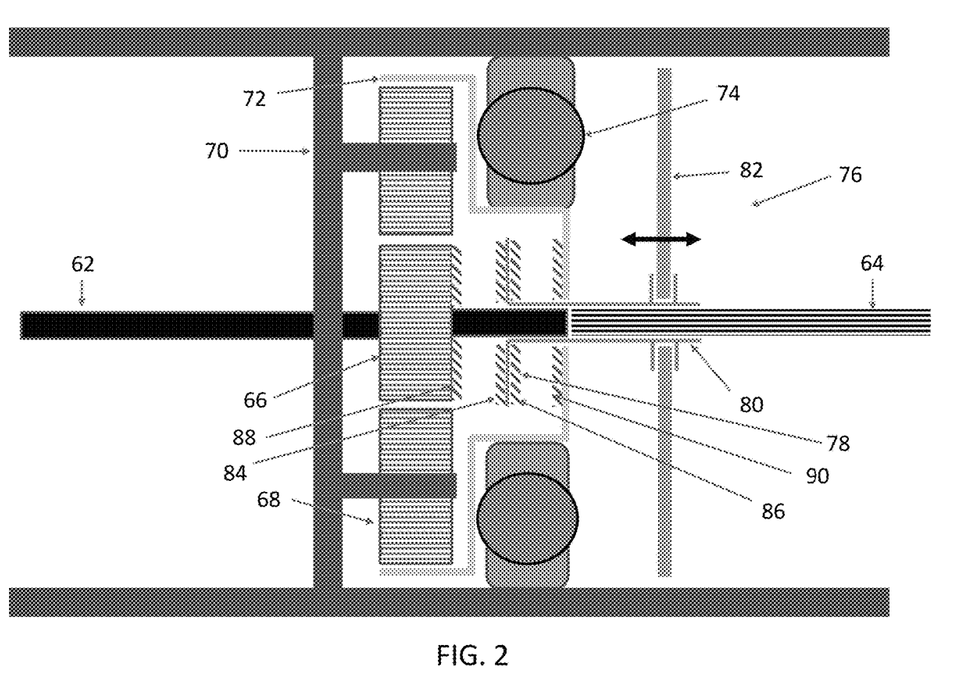
FIG. 2 depicts one embodiment of a transmission.
Figure 3:
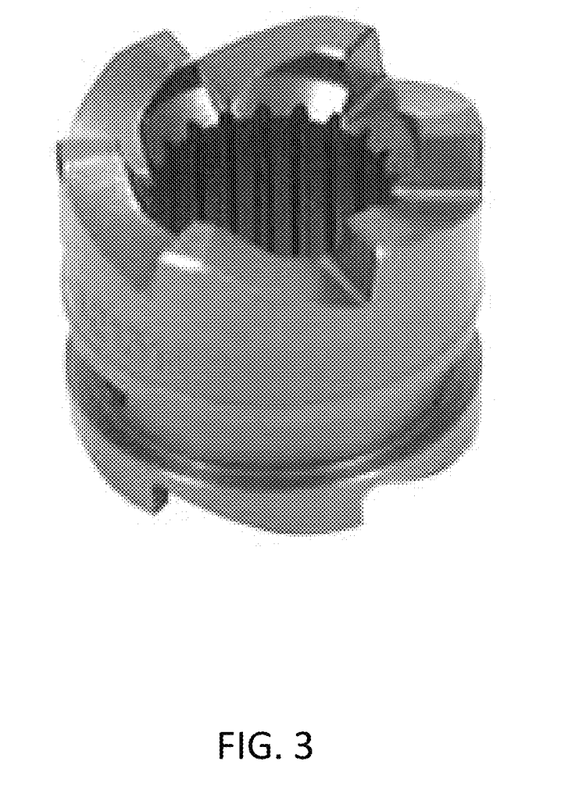
FIG. 3 depicts an embodiment of a clutch.

Turning now to FIGS. 2 and 3, with continued reference to FIG. 1, one embodiment of the transmission 56 is illustrated which includes or is otherwise coupled with a first shaft 62 and a second shaft 64. The transmission 56 permits the first shaft 62 to rotate in a single rotational direction to provide power to the transmission 56, while the direction of rotation of the second shaft 64 can be changed from the same direction to an opposing direction through selective use of a geared arrangement discussed further below. The transmission 56 can be configured to receive power from the first shaft and provide rotational power which can be used directly at the speed and power provided, or can be changed to any other suitable form for the power tool driven member 52. The speed ratio of the forward and reverse gear can be configured according to the needs of any given application. Power can be delivered direct from the second shaft 64 to the driven member 52, but in some forms additional and/or alternative shafting and/or gearing can be used to transfer power from the second shaft 64 of the transmission 56 to the tool end 52.

In some forms the first shaft 62 can be an input shaft that delivers power 58 to the transmission 56, and the second shaft 64 can be an output shaft that delivers power from the transmission 56. In other forms, however, the relationship between the first and second shafts 62 and 64 relative to whether they act as input power shaft or output power shaft can be reversed. In one form, the first shaft 62 and the second shaft 64 are structured to rotate about a common rotational axis.

The first shaft can be coupled with a clutchable planetary gear system which can take a variety of different forms to assist in operating the power tool driven member 52 in a forward and a reverse direction. In the illustrated embodiment the first shaft is coupled with a pinion 66 which is connected to and rotates with the first shaft 62. The pinion 66 is rotatingly coupled with a plurality of planet gears 68 mounted in a planet gear carrier 70. In the illustrated embodiment the planet gear carrier 70 is fixed to ground and does not rotate. The planet gears 68 are also rotatingly coupled with a ring gear 72 such that in sum, when shaft 62 rotates, rotational motion also occurs in pinion 66, planet gears 68, and ring gear 72. A bearing 74 can be used to support and constrain movement of the ring gear 72. In one form the bearing 74 is a ball bearing having an inner and outer race, but other forms of bearings are contemplated herein. In general, rotational motion will occur along the gear train that includes the pinion 66, planet gears 68, and ring gear 72 whenever first shaft 62 is rotated, absent a clutching mechanism disposed in the path. In other alternative and/or additional embodiments, additional lay shafts can be included to couple any of the gears (66, 68, 72) in the gear train together.

The second shaft 64 is coupled with a clutch assembly 76 which allows for selective coupled engagement with the first shaft 62. The clutch assembly 76 can include a clutch mechanism 78 slidably movable along the second shaft 64 via a coupler 80. The clutch mechanism 76 can be housed in a recess of the ring gear 72 as depicted, but other embodiments may not include such a recess. Furthermore, the first shaft 62 can extend into the clutch mechanism 76 and/or coupler 80 that carries the clutch mechanism 76. In some forms the first shaft 62 may not extend into the clutch mechanism 76. In one form the second shaft 64 is splined and configured to engage with a complementary splined surface of the clutch mechanism 78. The clutch mechanism 78 is structured to rotate anytime that the second shaft 64 is rotated. The clutch mechanism 78 can be actuated via a clutch actuator 82 which can take any variety of forms useful to impart motion to the clutch mechanism 78 along the second shaft 64. In one form the clutch actuator 82 illustrated in the figure can be engaged with other structure that provides the motive force to move the clutch mechanism 78. The clutch mechanism 78 can take a variety of forms as will be appreciated, including a dog clutch, and a single plate clutch to name just a few. One nonlimiting example of a clutch mechanism 78 is illustrated in FIG. 3 which depicts an axial jaw clutch and an internal splined surface. As will be appreciated given the figures of the instant application, the clutch mechanism 78 can include a first clutch face 84 and a second clutch face 86 which are useful to engage with corresponding surfaces as described immediately below.

The first shaft 62 can be coupled with a first contact surface 88, while the ring gear 72 can be coupled with a second contact surface 88. The first contact surface 88 and second contact surface can take any variety of forms useful to engage with the clutch mechanism 78. In the embodiment in which the clutch mechanism 78 includes jaw clutches as the first clutch face 84 and second clutch face 86, complementary shaped faces formed in the first contact surface 88 and second contact surface 90. Other forms are also contemplated. In the illustrated embodiment, the first contact surface 88 is coupled with the pinion 66 via a direct connection, but other embodiments can include additional structure interposed between the first contact surface 88 and the pinion 66 while still maintaining a coupled connection. To set forth just a few nonlimiting examples, the first contact surface 88 can be directly connected to the shaft 62, or additional lay shafts can be used to offset the first contact surface 88 from the pinion 66. Similarly, although the second contact surface 88 is illustrated as directly coupled to the ring gear 72, other embodiments can include additional structure interposed between the second contact surface 90 and the ring gear 72 while still maintaining a coupled connection. To set forth just one nonlimiting example, additional lay shafts can be used to offset the first contact surface 88 from the pinion 66.

Figure 4:
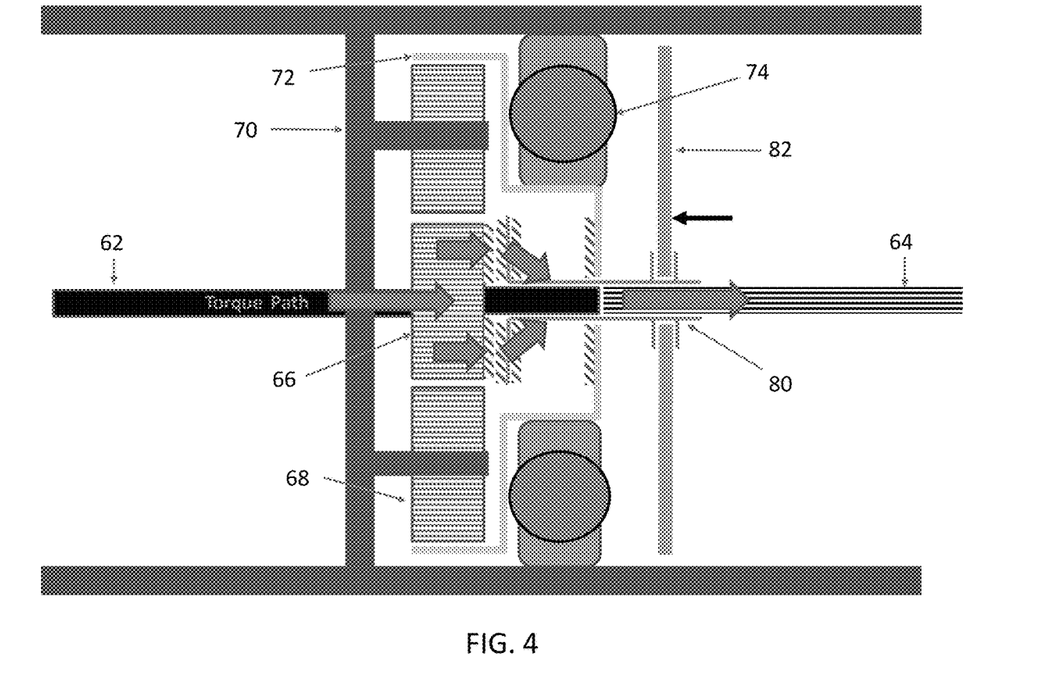
FIG. 4 depicts the embodiment of FIG. 2 in a first operational mode.

Turning now to FIG. 4, one operating condition of the instant application is shown in which the first shaft 62 is coupled to the second shaft 64 to provide a common rotational direction of both shafts. In one nonlimiting form this can be considered a forward motion of shaft 64. Power flows from the first shaft 62, to the first contact surface 88, to the first clutch face 84 of the clutch mechanism 78, and to the second shaft 64.

Figure 5:
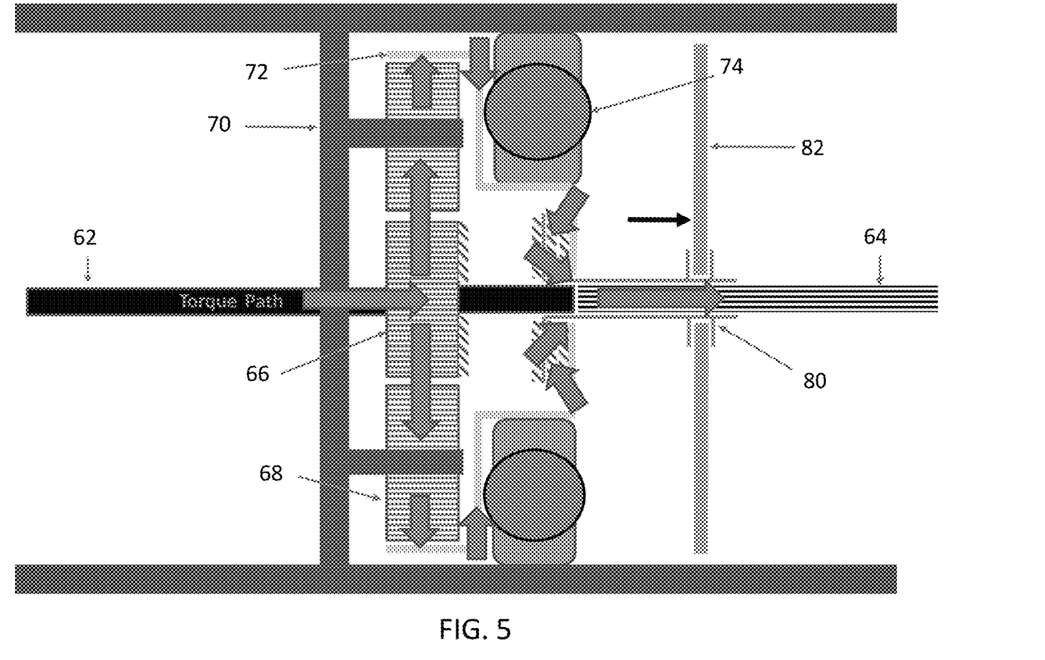
FIG. 5 depicts the embodiment of FIG. 2 in a second operational mode.

FIG. 5 depicts another operating condition of the instant application in which the first shaft 62 is coupled to the second shaft 64 to provide opposing rotational motion of the shafts. In one nonlimiting form this can be considered a reversed motion of shaft 64. Power flows from the first shaft 62, through the pinion 66, to the planet gears 68, to the ring gear 72, to the second contact surface 90, to the second clutch face 86 of the clutch mechanism 78, and to the second shaft 64.

One aspect of the present application includes an apparatus comprising a power tool structured to provide motive power to drive an attachment, the power tool including: a first shaft structured to rotate about a first shaft axis, a second shaft selectively coupled with the first shaft and structured to rotate about the second shaft axis, a power transmission structured to transmit powered rotation between the first shaft and the second shaft, the power transmission including: a pinion gear connected to rotate with the first shaft, a planet carrier having a plurality of planet gears in power transmission with the pinion gear, a single ring gear radially outward of and in power transmission with the plurality of planet gears, and a clutch assembly having a clutch mechanism configured to place the first shaft and second shaft in power communication, the clutch assembly having a first position in which a clutch mechanism couples the first shaft to the second shaft to form a power flow path that bypasses the single ring gear, the clutch assembly having a second position in which the clutch mechanism couples the first shaft to the second shaft to form a power flow path between the single ring gear and the second shaft.

A feature of the present application includes wherein the clutch assembly is capable of driving the second shaft in a first direction and a second direction opposing the first direction depending on whether the clutch mechanism is in the first position or the second position, and wherein the clutch mechanism is structured to translate along the second shaft.

Another feature of the present application includes wherein the first shaft axis is coincident with the second shaft axis, wherein the single ring gear is structured to rotate whenever the first shaft is rotated, and wherein the clutch mechanism is configured to be rotated whenever the second shaft is rotated.

Still another feature of the present application includes wherein the pinion includes a contact surface used to connect with a complementary surface of the clutch mechanism when the clutch mechanism is in the first position.

Yet another feature of the present application includes wherein the single ring gear includes a ring gear contact surface used to connect with a complementary surface of the clutch mechanism when the clutch mechanism is in the second position.

Yet still another feature of the present application includes wherein the clutch assembly includes a shifting actuator, and wherein the clutch is an axial jaw clutch.

Still yet another feature of the present application includes wherein the first shaft is a driven shaft and the second shaft is a drive shaft.

A further feature of the present application includes wherein the clutch mechanism includes a central opening through which the first shaft extends, the first shaft free to rotate within the central opening.

Another aspect of the present application includes an apparatus comprising a hand held tool structured to convert an energy source into useful power to drive an attachment, the hand held tool including: a first shaft structured to rotate about an axis of rotation and coupled with a first contact surface that rotates upon rotation of the first shaft, a second shaft rotatable about the axis of rotation, a power transmission having: a planetary gear system having a plurality of gears including a ring gear that is coupled with a second contact surface, a clutch mechanism connected to rotate with the second shaft and configured to slide along the second shaft, the clutch mechanism including a first clutch face and a second clutch face, the clutch mechanism configured to be slid into a first position to connect the first clutch face with the first contact surface such that power transmission path is formed to bypass the ring gear, the clutch mechanism configured to be slid into a second position to connect the second clutch face with the second contact surface such that power transmission path is formed to include the ring gear.

A feature of the present application includes wherein the ring gear is configured to rotate whenever the first shaft is rotated, and wherein the clutch mechanism is configured to rotate whenever the second shaft is rotated.

Another feature of the present application includes wherein planetary gear system includes a central pinion and a plurality of planet gears disposed between the central pinion and the ring gear.

Still another feature of the present application includes wherein the first contact surface is connected directly to the central pinion, and wherein the second contact surface is connected directly to the ring gear.

Yet another feature of the present application includes wherein the clutch mechanism includes an inner splined surface, the second shaft includes outer splined surface, and wherein the inner splined surface of the clutch mechanism is in sliding contact with the outer splined surface of the second shaft.

Still yet another feature of the present application includes wherein the first clutch face and the second clutch face are each formed as respective jaw clutch surfaces.

Yet still another feature of the present application includes wherein the clutch mechanism includes a central aperture through which the first shaft extends.

A further feature of the present application includes wherein the speed ratio of the forward and backward direction is non-unitary.

Yet another aspect of the present application includes a method comprising providing driving power to rotate a first shaft of a hand held power tool, the first shaft coupled with a first contact surface, flowing power through the first contact surface to a first clutch face of a sliding clutch when the sliding clutch is in a first position, the clutch rotatively captured by and configured to slide along a second shaft, the flowing power providing rotative driven motion to the second shaft, moving the sliding clutch to a second position to reverse the direction of the second shaft, and flowing power through a second contact surface coupled with a ring gear to a second clutch face of the sliding clutch when the sliding clutch is in a second position.

A feature of the present application further includes rotating a planetary gear set which includes the ring gear whether the sliding clutch is in the first position or the second position.

Another feature of the present application includes wherein the planetary gear set includes a central pinion connected to the first shaft, and a plurality of planet gears disposed between the central pinion and the ring gear.

Yet another feature of the present application further includes moving a shifting actuator coupled to the sliding clutch, and wherein the first contact surface is connected directly to the central pinion.

Still another feature of the present application includes sheltering the first shaft within a recess of the sliding clutch.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
   a power tool structured to provide motive power to drive an attachment, the power tool including:
   a first shaft structured to rotate about a first shaft axis;
   a second shaft selectively coupled with the first shaft and structured to rotate about the second shaft axis;
   a power transmission structured to transmit powered rotation between the first shaft and the second shaft, the power transmission including:
   a pinion gear connected to rotate with the first shaft;
   a planet carrier fixed to ground and having a plurality of planet gears in power transmission with the pinion gear;
   a single ring gear radially outward of and in power transmission with the plurality of planet gears; and
   a clutch assembly having a clutch mechanism configured to place the first shaft and second shaft in power communication, the clutch assembly having a first position in which a clutch mechanism couples the first shaft to the second shaft to form a power flow path that bypasses the single ring gear, the clutch assembly having a second position in which the clutch mechanism couples the first shaft to the second shaft to form a power flow path between the single ring gear and the second shaft.

2. The apparatus of claim 1, wherein the clutch assembly is capable of driving the second shaft in a first direction and a second direction opposing the first direction depending on whether the clutch mechanism is in the first position or the second position, and wherein the clutch mechanism is structured to translate along the second shaft.

3. The apparatus of claim 2, wherein the first shaft axis is coincident with the second shaft axis, wherein the single ring gear is structured to rotate whenever the first shaft is rotated, and wherein the clutch mechanism is configured to be rotated whenever the second shaft is rotated.

4. The apparatus of claim 3, wherein the pinion includes a contact surface used to connect with a complementary surface of the clutch mechanism when the clutch mechanism is in the first position.

5. The apparatus of claim 3, wherein the single ring gear includes a ring gear contact surface used to connect with a complementary surface of the clutch mechanism when the clutch mechanism is in the second position.

6. The apparatus of claim 2, wherein the clutch assembly includes a shifting actuator, and wherein the clutch is an axial jaw clutch.

7. The apparatus of claim 6, wherein the first shaft is a driven shaft and the second shaft is a drive shaft.

8. The apparatus of claim 7, wherein the clutch mechanism includes a central opening through which the first shaft extends, the first shaft free to rotate within the central opening.

9. An apparatus comprising:
a hand held tool structured to convert an energy source into useful power to drive an attachment, the hand held tool including:
a first shaft structured to rotate about an axis of rotation and coupled with a first contact surface that rotates upon rotation of the first shaft;
a second shaft rotatable about the axis of rotation;
a power transmission having:
a planetary gear system having a plurality of gears including a ring gear that is coupled with a second contact surface;
a clutch mechanism connected to rotate with the second shaft and configured to slide along the second shaft, the clutch mechanism including a first clutch face and a second clutch face, the clutch mechanism configured to be slid into a first position to connect the first clutch face with the first contact surface such that power transmission path is formed to bypass the ring gear, the clutch mechanism configured to be slid into a second position to connect the second clutch face with the second contact surface such that power transmission path is formed to include the ring gear.

10. The apparatus of claim 9, wherein the ring gear is configured to rotate whenever the first shaft is rotated, and wherein the clutch mechanism is configured to rotate whenever the second shaft is rotated.

11. The apparatus of claim 9, wherein planetary gear system includes a central pinion and a plurality of planet gears disposed between the central pinion and the ring gear.

12. The apparatus of claim 11, wherein the first contact surface is connected directly to the central pinion, and wherein the second contact surface is connected directly to the ring gear.

13. The apparatus of claim 11, wherein the clutch mechanism includes an inner splined surface, the second shaft includes outer splined surface, and wherein the inner splined surface of the clutch mechanism is in sliding contact with the outer splined surface of the second shaft.

14. The apparatus of claim 13, wherein the first clutch face and the second clutch face are each formed as respective jaw clutch surfaces.

15. The apparatus of claim 11, wherein the clutch mechanism includes a central aperture through which the first shaft extends.

16. The apparatus of claim 15, wherein the speed ratio of the forward and backward direction is non-unitary.

17. A method of operating the apparatus of claim 9, the method comprising:
providing driving power to rotate the first shaft of the hand held tool, the first shaft coupled with the first contact surface;
flowing power through the first contact surface to a first clutch face of the clutch mechanism, the clutch mechanism in the form of a sliding clutch, the flowing power through the first contact surface occuring when the sliding clutch is in a first position, the clutch rotatively captured by and configured to slide along the second shaft, the flowing power providing rotative driven motion to the second shaft;
moving the sliding clutch to a second position to reverse the direction of the second shaft; and
flowing power through the second contact surface coupled with the ring gear to the second clutch face of the sliding clutch when the sliding clutch is in a second position.

18. The method of claim 17, which further includes rotating the planetary gear system which includes the ring gear whether the sliding clutch is in the first position or the second position.

19. The method of claim 18, wherein the planetary gear set includes a central pinion connected to the first shaft, and the plurality of planet gears disposed between the central pinion and the ring gear.

* * * * *